(12) United States Patent
Staehle

(10) Patent No.: US 10,272,940 B2
(45) Date of Patent: Apr. 30, 2019

(54) STEERING WHEEL ACTUATION DEVICE

(71) Applicant: Kurt Staehle, Neuhausen-Steinegg (DE)

(72) Inventor: Kurt Staehle, Neuhausen-Steinegg (DE)

(*) Notice: Subject to any disclaimer, the term of this patent is extended or adjusted under 35 U.S.C. 154(b) by 158 days.

(21) Appl. No.: 15/082,516

(22) Filed: Mar. 28, 2016

(65) Prior Publication Data

US 2016/0280250 A1 Sep. 29, 2016

(30) Foreign Application Priority Data

Mar. 27, 2015 (EP) .................................. 15000901

(51) Int. Cl.
*B62D 1/00* (2006.01)
*B62D 5/04* (2006.01)
*B62D 6/00* (2006.01)

(52) U.S. Cl.
CPC .............. *B62D 5/0403* (2013.01); *B62D 1/00* (2013.01); *B62D 5/04* (2013.01); *B62D 6/00* (2013.01)

(58) Field of Classification Search
CPC .......... B62D 1/00; B62D 5/04; B62D 5/0403; B62D 5/001; B62D 6/00; B62D 15/025
USPC ................. 180/444, 167; 74/494; 701/2, 41; 318/17
See application file for complete search history.

(56) References Cited

U.S. PATENT DOCUMENTS

| | | | | |
|---|---|---|---|---|
| 7,142,963 B2 * | 11/2006 | Borroni-Bird | ......... | B60K 37/06 180/444 |
| 7,626,308 B2 * | 12/2009 | Kang | .................. | H02K 21/225 310/254.1 |
| 7,648,004 B1 * | 1/2010 | Larouche | ................. | B62D 1/00 180/443 |
| 8,680,739 B2 * | 3/2014 | Aoyama | ................ | H02K 1/141 310/216.023 |
| 8,700,216 B2 * | 4/2014 | Best | ........................ | B62D 1/00 700/245 |
| 8,967,320 B2 * | 3/2015 | Markfort | ................ | B62D 5/008 180/443 |
| 2009/0099710 A1* | 4/2009 | Takach, Jr. | ................ | B60T 7/16 701/2 |
| 2016/0214643 A1* | 7/2016 | Joughin | .................. | G01S 19/42 |

FOREIGN PATENT DOCUMENTS

EP          2511152         *    4/2011    ............... B62D 1/00

* cited by examiner

*Primary Examiner* — Anne Marie M Boehler
(74) *Attorney, Agent, or Firm* — Browdy and Neimark, PLLC

(57) ABSTRACT

A steering wheel actuation device for retrofit mounting to a steering wheel of a motor vehicle and for applying a motor-driven torque to same includes a stator suitable for bracing against rotational movement and a rotor having attachment devices for the torque-proof attachment to the steering wheel, wherein said rotor is rotatable against the stator and wherein the stator features a U-shaped design, which extends over a curved section and forms an open section.

16 Claims, 2 Drawing Sheets

STEERING WHEEL ACTUATION DEVICE

FIELD

A steering wheel actuation device for retrofit mounting on the standard steering wheel of a motor vehicle, such as a personal vehicle or truck, for retrofit mounting on a steering wheel of the motor vehicle and for applying a motor-driven torque to it. This steering wheel actuation device serves to apply a motor-driven torque to the steering wheel to perform a steering movement without manual application of force. This enables an at least temporary motor-driven actuation of the steering wheel, for example within the context of remote control, independent control, or during test operation. The steering wheel actuation device comprises a stator that can be braced at the vehicle against torsional movement and can be connected to electrical voltage as well as a rotor that is rotatable along the stator depending on the stator's electrical voltage. This rotor in turn comprises attachment devices for torque-proof attachment to the steering wheel.

BACKGROUND

WO 2011/007114 A1 discloses a steering robot having a concentrically arranged steering motor with a circular stator and rotor for the actuation of a vehicular steering wheel. The stator and rotor are attached at the front of the steering wheel, with the stator additionally attached to the motor vehicle. An additional steering wheel is mounted on the engine, which allows for the manual actuation of the steering wheel by means of the steering motor.

The design of the known steering robot enables a person to fit behind the steering wheel even when it is installed to ensure manual actuation in case of a blocked motor. In addition, a steering wheel airbag can deploy through the spaces defined by the stator, rotor, and additional steering wheel. However, the steering robot known from prior art has the disadvantage that it requires a relatively large additional construction space extending out from the steering wheel. This not only decreases the space available to the person occupying the seat, but can also significantly affect the functionality of the airbag. Furthermore, the special design of the motor results in relatively high production costs for the steering robot as a whole.

The problem to be solved by the invention is to avoid the above-listed disadvantages for a generic steering wheel actuation device and to allow for the simple attachment at a steering wheel with little space required.

SUMMARY

This problem is solved by a steering wheel actuation device with the characteristics that, the stator has a U-shaped design and extends over a curved section in such a way that it features a permanently open section even in operational condition with the rotor attached. This allows for arranging the stator around the steering column of the steering wheel concerned without further measures over the open section so that it can be braced torque-free at the remainder of the vehicle on the rear of the steering wheel. Due to this arrangement of the stator on the rear of the steering wheel, a large portion of the steering wheel actuation device is positioned outside of the space between the steering wheel and the driver's seat. As a consequence, this space can be fully occupied by a person seated behind the steering wheel. In this manner, the steering wheel actuation device is also usable in scenarios where a person is sitting at the steering wheel without restricting the space or mobility of this person with the steering wheel actuation device. Furthermore, an airbag contained in the steering wheel can be operated without restriction with such a steering wheel actuation device.

In a particularly advantageous embodiment, the U-shaped stator consists of one piece to make it cost-effective and stable to produce.

It is advantageous for the curved section over which the stator extends to have an angular range between 180° and 350°, preferably between 240° and 300°, around an open center. In this manner, it is easy to generate the necessary torque for actuating the steering wheel in spite of the open stator design because of the rotor's interaction with the stator.

In an advantageous embodiment, the rotor has a circular design and comprises a cover section and an opening section that can be shifted relative to the cover section, which serves to open the rotor. The curved section of the stator can be covered essentially completely, meaning by at least 90%, by the cover section of the rotor. Due to this essentially complete coverage of the stator by the opening section, it can be ensured with the corresponding positioning of the cover section that no major magnetic forces exist between the stator and the opening section, so that the opening section can easily be brought from a closed position to an open position without exerting force.

It is also advantageous for the opening section to have the ability to swivel against the cover section. In this manner, the rotor can easily be moved to the open position to allow for arranging it around the steering column along with the stator. For this purpose, the opening section of the rotor is aligned with the open section of the stator in order to fit the steering column in the open center of the stator. The rotor can then be swiveled to the closed position to secure it at the stator and to connect it to the steering wheel.

In an advantageous embodiment, a detachable locking device is located between the opening section and the cover section to securely attach the rotor in the closed position.

Furthermore, it is advantageous for the attachment device to comprise at least one connection element that can be used to attach a steering wheel counter-bearing to the rotor by means of the steering wheel. Attaching such a steering wheel counter-bearing enables a particularly stable, torque-proof connection between the rotor and the steering wheel.

In one advantageous embodiment, the steering wheel counter-bearing features a circular design so that the steering wheel can be comfortably gripped and actuated manually even when the steering wheel actuation device is attached. This allows, for example, a person occupying the space behind the steering wheel to actuate the steering wheel manually at any time.

Furthermore, it is advantageous in all cases for the steering wheel counter-bearing to feature an edge area, which conically tapers from a front side facing the steering wheel to a front side of the steering wheel counter-bearing facing away from the steering wheel. In this manner, the steering wheel counter-bearing can be attached to the rotor by means of the steering wheel in such a way that the steering wheel actuation device automatically centers itself around the steering wheel when the connection elements are tightened. This again guarantees the precise and unimpaired control of the steering wheel when the steering wheel actuation device is in use.

In another advantageous embodiment, the steering wheel counter-bearing features a single-piece design, which ensures sufficient stability and unimpaired manual operability of the steering wheel actuation device.

An advantageous embodiment features at least three connection elements axially extending from the rotor, of which one is attached to the opening section. In this manner, the connection elements can also be swiveled along with the opening section to move to a closed position and an open position. The connection elements can more easily be positioned at the steering wheel in the open position, particularly at a radial exterior side of the steering wheel.

BRIEF DESCRIPTION OF THE DRAWINGS

The figures show an exemplary embodiment of the invention. The illustrations show the following.

DETAILED DESCRIPTION

Figure 1:
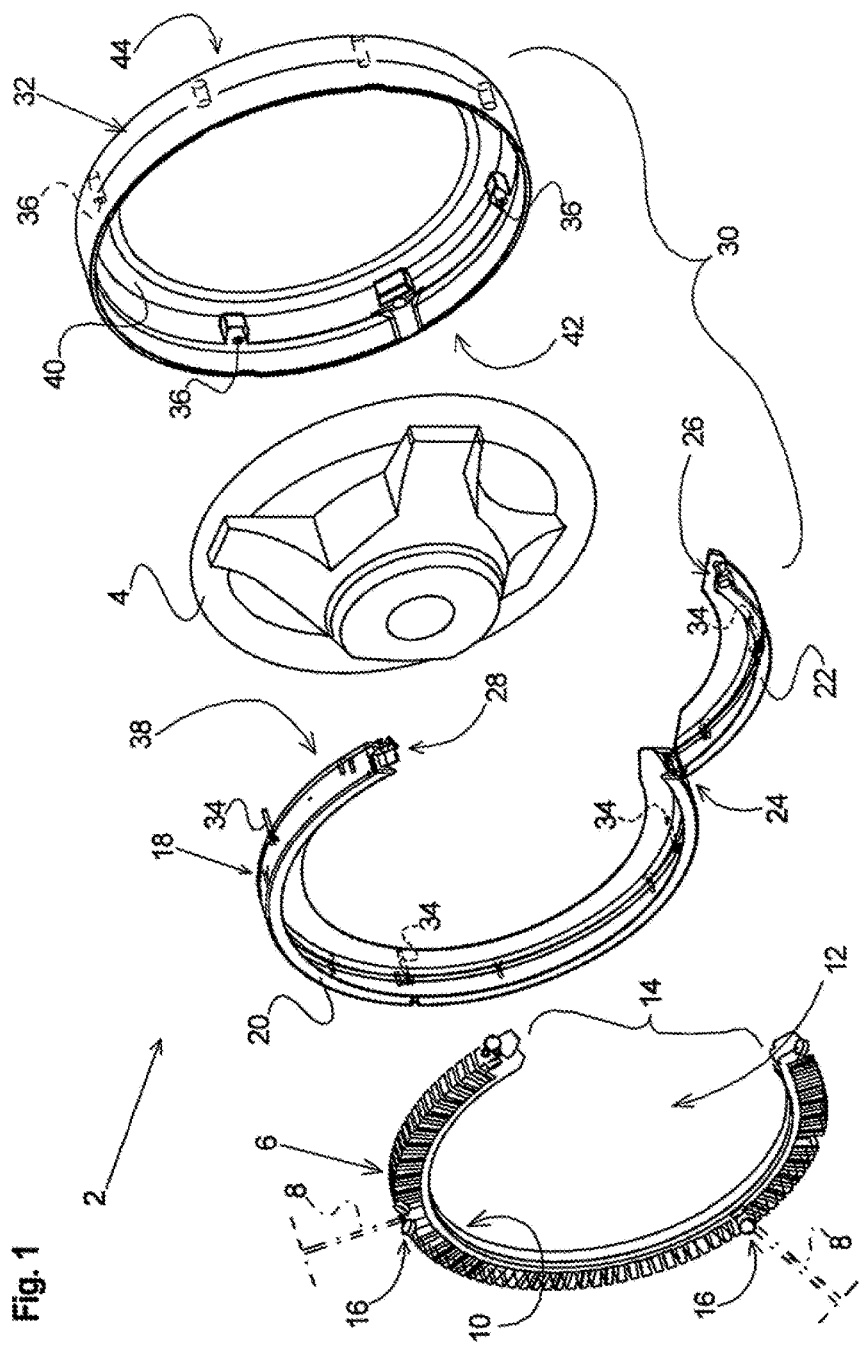
FIG. 1 shows an exploded view of a steering wheel actuation device according to the invention in perspective and FIG. 2 is a perspective view of the steering wheel actuation device according to FIG. 1 in operational position.

FIG. 1 shows a steering wheel actuation device 2 for retrofit mounting to a vehicular steering wheel 4. It comprises a stator 6, which can be braced against torsional or other movement via the braces 8, which are only shown schematically. For this purpose, braces 8 can be attached to fixed parts of a motor vehicle, such as a dashboard or windshield, in a manner not further specified.

Stator 6 has a single-part U-shaped design and extends over a curved section 10 having an angular range between 240° and 300°. In this manner, stator 6 forms an open center 12 and an open section 14.

Furthermore, stator 6 comprises an arrangement of rollers 16 forming a rotating bearing for a rotor 18 that can be placed on stator 6. Rotor 18 comprises a cover section 20 and an opening section 22, which can be shifted relative to the cover section 20 between the open position shown here and a closed position. For this purpose, the opening section 22 can, for example, be attached to cover section 20 by way of a joint 24.

Furthermore, the end of opening section 22 facing away from joint 24 comprises locking devices 26, which serve to lock opening section 22 in closed position with the locking counter-device 28 of the open section 20, keeping rotor 18 in a stable circular shape.

Furthermore, the steering wheel actuation device 2 comprises attachment devices summarily referred to as 30, which allow for attaching rotor 18 to steering wheel 4 in a torque-proof manner. These attachment devices feature a circular steering wheel counter-bearing 32, which can be attached to rotor 18 by means of steering wheel 4. For this purpose, rotor 18 comprises several connection devices 34, which function together with the corresponding connection counter-devices 36 of the steering wheel counter-bearing 32. The connection devices 34 can, for example, be formed by screw elements with an external thread as shown, which extend from the steering-wheel front side 38 of rotor 18 and can be screwed into connection counter-devices 36 featuring a complementary inside thread or vice versa.

As shown here, steering wheel counter-bearing 32 can be made of a single piece to guarantee high stability. As an alternative, steering wheel counter-bearing 32 can also feature a multi-part design, for example to facilitate transport or assembly.

In addition, steering wheel counter-bearing 32 features an interior edge area 40, which serves for attachment to steering wheel 4. This edge area 40 has a circular design and tapers conically from a steering-wheel-facing front side 42 to a front side 44 facing away from the steering wheel of the steering wheel counter-bearing 32.

At least one of the connection devices 34 can also be designed to swivel, together with opening section 22, in relation to the remaining connection devices 34, for the easy attachment of rotor 18 with its connection devices 34 extending on the perimeter at front side 38 to steering wheel 4.

Figure 2:
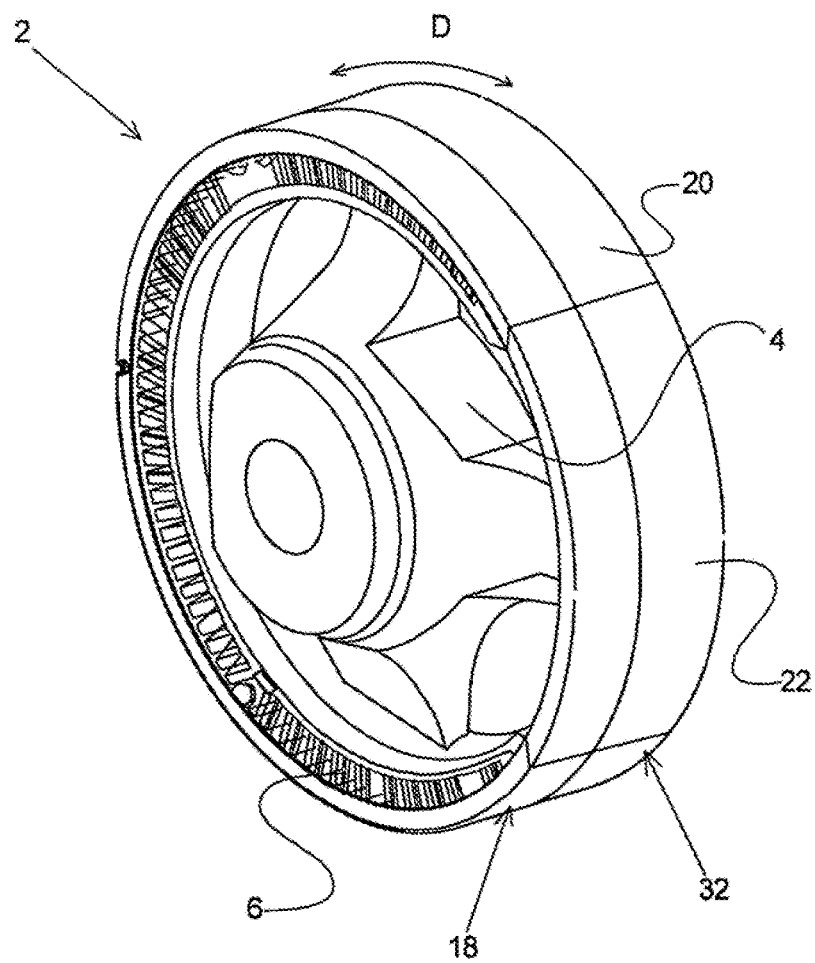

FIG. 2 shows the steering wheel actuation device 2 in attached condition at steering wheel 4. Rotor 18 is arranged to swivel on stator 6 and has been moved in the closed position, in which the cover section 20 and the opening section 22 jointly form a circular arrangement and are interlocked. At the same time, rotor 18 is connected to the steering wheel counter-bearing 32 via the connection devices 34 and the connection counter-devices 36 by means of steering wheel 4. The connection devices 34 and the connection counter-devices 36 are sufficiently tightened to guarantee a torque-proof connection between rotor 18 and steering wheel 4. When tightening the connection devices 34 and the connection counter-devices 36, the conically tapered edge area 40 achieves the automatic centering of the steering wheel counter-bearing 32 and the steering wheel actuation device 2 relative to the steering wheel.

When stator 6 is connected to a power supply that is not further specified, a torque can now be applied to rotor 18 to move it in a rotational direction D. Due to the torque-proof connection of the steering wheel actuation device 2 and the steering wheel 4, this allows for executing a desired steering movement in rotational direction D. In this manner, the steering of a motor vehicle can be remotely controlled or automated via the motorized drive of the steering wheel actuation device 2.

To remove the steering wheel actuation device 2 from steering wheel 4, rotor 18 can be returned to a rotational position as shown in FIG. 2, in which the opening section 22 is aligned over the open section 14 of stator 6. In this rotational position, the magnetic forces between stator 6 and the opening section 22 are minimal, which ensures that opening section 22 can be easily unlocked after separation from the steering wheel counter-bearing 32 and returned to the open position shown in FIG. 1.

In this open position, rotor 18 can be detached from stator 6 or from steering wheel 4, whereafter stator 6 can also be removed from its position adjacent to steering wheel 4 to return to its unimpaired manual operation.

The invention claimed is:

1. A steering wheel actuation device for retrofit mounting on a steering wheel of a motor vehicle and for applying a motor-driven torque to the steering wheel, comprising:
    a U-shaped stator configured to be braced against a rotational movement by connection to the motor vehicle, the U-shaped stator comprising a curved section extending over only a portion of a circumference of the U-shaped stator and a permanently open section defined in the portion of the circumference, and
    a rotor comprising attachment devices for attaching the rotor to the steering wheel in a rigid non-rotating manner,
    wherein said rotor is rotatable against the stator,
    wherein the attachment devices comprise a steering wheel counter-bearing and at least one connection element for attaching the steering wheel counter-bearing to the rotor on respective sides of the steering wheel.

2. The steering wheel actuation device according to claim 1, wherein the U-shaped stator is a single piece.

3. The steering wheel actuation device according to claim 1, wherein the curved section over which the stator extends has an angular range between 180° and 350° around an open center.

4. The steering wheel actuation device according to claim 1, wherein the rotor has a circular design and comprises a cover section and an opening section, which can be shifted relative to this cover section to open the rotor, wherein the curved section of the stator can be essentially completely covered by the cover section of rotor.

5. The steering wheel actuation device according to claim 4, wherein the opening section is designed to swivel against the cover section.

6. The steering wheel actuation device according to claim 4, wherein detachable locking devices are arranged between the opening section and the cover section.

7. The steering wheel actuation device according to claim 1, wherein the steering wheel counter-bearing has a circular shape.

8. The steering wheel actuation device according to claim 1, wherein the steering wheel counter-bearing features an edge area, which tapers from a front side facing the steering wheel to a front side of the steering wheel counter-bearing facing away from the steering wheel.

9. The steering wheel actuation device according to claim 1, wherein the steering wheel counter-bearing is formed from a single piece.

10. The steering wheel actuation device according to claim 1, wherein the rotor has a circular design and comprises a cover section and an opening section, and wherein at least three connection elements extend axially from the rotor and one of the at least three connection elements is positioned at the opening section.

11. The steering wheel actuation device according to claim 1, wherein the curved section over which the stator extends has an angular range between 240° and 300° around an open center.

12. A steering wheel actuation device for retrofit mounting on a steering wheel of a motor vehicle and for applying a motor-driven torque to the steering wheel, comprising:
    a U-shaped stator suitable for bracing against a rotational movement, and
    a rotor comprising attachment devices for the torque-proof attachment of the rotor to the steering wheel,
    wherein said rotor is rotatable against the stator,
    wherein the stator is U-shaped, and extends over a curved section and defines an open section, and
    wherein the attachment devices comprise a steering wheel counter-bearing and at least one connection element, for attaching the steering wheel counter-bearing to the rotor on respective sides of the steering wheel.

13. The steering wheel actuation device according to claim 12, wherein the steering wheel counter-bearing has a circular shape.

14. The steering wheel actuation device according to claim 12, wherein the steering wheel counter-bearing features an edge area, which tapers from a front side facing the steering wheel to a front side of the steering wheel counter-bearing facing away from the steering wheel.

15. The steering wheel actuation device according to claim 12, wherein the steering wheel counter-bearing is formed from a single piece.

16. The steering wheel actuation device according to claim 12, wherein the rotor has a circular design and comprises a cover section and an opening section, and wherein at least three connection elements extend axially from the rotor and one of the at least three connection elements is positioned at the opening section.

* * * * *